(12) United States Patent
Fuchs et al.

(10) Patent No.: US 10,114,830 B2
(45) Date of Patent: Oct. 30, 2018

(54) LAZY LOGGER WRAPPERS

(71) Applicant: Oracle International Corporation, Redwood Shores, CA (US)

(72) Inventors: Daniel Jean-Michel Fuchs, Le Touvet (FR); Mandy L. Chung, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 210 days.

(21) Appl. No.: 15/173,237

(22) Filed: Jun. 3, 2016

(65) Prior Publication Data

US 2017/0091216 A1    Mar. 30, 2017

Related U.S. Application Data

(60) Provisional application No. 62/233,949, filed on Sep. 28, 2015.

(51) Int. Cl.
| | | |
|---|---|---|
| *G06F 1/00* | (2006.01) | |
| *G06F 17/30* | (2006.01) | |
| *G06F 9/4401* | (2018.01) | |
| *G06F 9/455* | (2018.01) | |
| *G06F 11/30* | (2006.01) | |

(52) U.S. Cl.
CPC ...... *G06F 17/30144* (2013.01); *G06F 9/4401* (2013.01); *G06F 9/45558* (2013.01); *G06F 11/30* (2013.01)

(58) Field of Classification Search
CPC .. G06F 17/30144; G06F 11/30; G06F 9/4401; G06F 9/45558; G06F 2009/45575
See application file for complete search history.

(56) References Cited

U.S. PATENT DOCUMENTS

| | | | |
|---|---|---|---|
| 6,738,832 B2 | 5/2004 | Burr et al. | |
| 7,017,077 B2 | 3/2006 | Lowen et al. | |
| 7,716,017 B2 | 5/2010 | Pfohe et al. | |
| 8,468,528 B2 | 6/2013 | Patil et al. | |
| 9,569,328 B2 | 2/2017 | Pavlov et al. | |
| 2003/0005183 A1* | 1/2003 | Burr ................. | G06F 11/3006 710/1 |
| 2008/0201616 A1* | 8/2008 | Ashmore ............ | G06F 11/0727 714/57 |

* cited by examiner

*Primary Examiner* — Austin Hicks
(74) *Attorney, Agent, or Firm* — Invoke

(57) ABSTRACT

The disclosed embodiments provide a method and system for lazily logging events of a software program at various points during the software program's execution. During operation, responsive to receiving one or more events to be logged from a software component during a bootstrap sequence of a virtual machine that the software component executes on, the system queues the one or more events in a particular storage location using a bootstrap logger. Then, subsequent to the completion of the bootstrap sequence, the system activates the subsequent logger, wherein the activation of the subsequent logger is dependent on the completion of the bootstrap sequence. The system then flushes events queued in the particular storage location to the subsequent logger, thereby enabling the subsequent logger to log each of the queued events to a subsequent storage location. Next, the system replaces the bootstrap logger with the subsequent logger.

20 Claims, 10 Drawing Sheets

LAZY LOGGER WRAPPERS

RELATED APPLICATION

This application claims priority under 35 U.S.C. § 119 to U.S. Provisional Application No. 62/233,949, entitled "Lazy Logger Wrappers," by Daniel Jean-Michel Fuchs and Mandy L. Chung, filed 28 Sep. 2015, the contents of which are herein incorporated by reference in their entirety.

BACKGROUND

Field

The disclosed embodiments relate to techniques for logging events for a software program. More specifically, the disclosed embodiments relate to techniques for lazily logging events from components of a software program.

Related Art

Logging, which refers to the act of recording interesting and/or important events that occur during the execution of a software program to a log, is generally a useful feature to include in a software program. Developers of the software program may use messages recorded within the log to debug the software program and/or track the software program's performance.

In some cases, however, components of the software program may log events at inappropriate times in the software program's execution. If a component attempts to log an event prior to the initialization of a logging component of the software program, the component may cause the software program to crash and/or experience other unexpected side effects.

Hence, what is needed is a logging component that allows other software components to log events at various points during the software program's execution without causing unexpected side effects.

SUMMARY

The disclosed embodiments provide a system for lazily logging events of a software program at various points during the software program's execution. During operation, responsive to receiving one or more events to be logged from a software component during a bootstrap sequence of a virtual machine that the software component executes on, the system queues the one or more events in a particular storage location using a bootstrap logger. Then, subsequent to the completion of the bootstrap sequence, the system activates the subsequent logger, wherein the activation of the subsequent logger is dependent on the completion of the bootstrap sequence. The system then flushes events queued in the particular storage location to the subsequent logger, thereby enabling the subsequent logger to log each of the queued events to a subsequent storage location. Next, the system replaces the bootstrap logger with the subsequent logger. Then, responsive to receiving a subsequent event to be logged from the software component, the system logs the subsequent event to the subsequent storage location using the subsequent logger.

In some embodiments, the above steps are performed by a logger wrapper that encapsulates the bootstrap logger prior to the replacement of the bootstrap logger with the subsequent logger and encapsulates the subsequent logger after the replacement. Additionally, the replacement of the bootstrap logger with the subsequent logger is initiated by the bootstrap logger.

In some embodiments, prior to the replacement of the bootstrap logger with the subsequent logger, the bootstrap logger performs a check on whether the bootstrap sequence has been completed whenever an event is received from the software component. Additionally, the replacement of the bootstrap logger with the subsequent logger removes the check.

In some embodiments, flushing the events queued in the particular storage location to the subsequent logger is performed in response to receiving a particular event to be logged from the software component, wherein no events are received from the software component between the completion of the bootstrap sequence and the reception of the particular event.

In some embodiments, after replacing the bootstrap logger with the subsequent logger, the system logs the particular event to the subsequent storage location using the subsequent logger.

In some embodiments, prior to receiving the one or more events to be logged from the software component, the system (1) receives a first event from the software component, wherein no events are received from the software component prior to the reception of the first event, (2) determines whether the bootstrap sequence has been completed, and (3) responsive to determining that the bootstrap sequence has not been completed, activates the bootstrap logger.

In some embodiments, the particular storage location includes a first in, first out (FIFO) queue.

In some embodiments, logging an event to the subsequent storage location using the subsequent logger includes directly storing the event to at least one of the following:
 (i) a plain text file;
 (ii) a binary log file; and
 (iii) a database.

As described herein, first, second, third, and other ordinal adjectives are naming conventions that are not necessarily indicative of order unless otherwise functionally required.

BRIEF DESCRIPTION OF THE FIGURES

In the figures, like reference numerals refer to the same figure elements.

DETAILED DESCRIPTION

Figure 1:
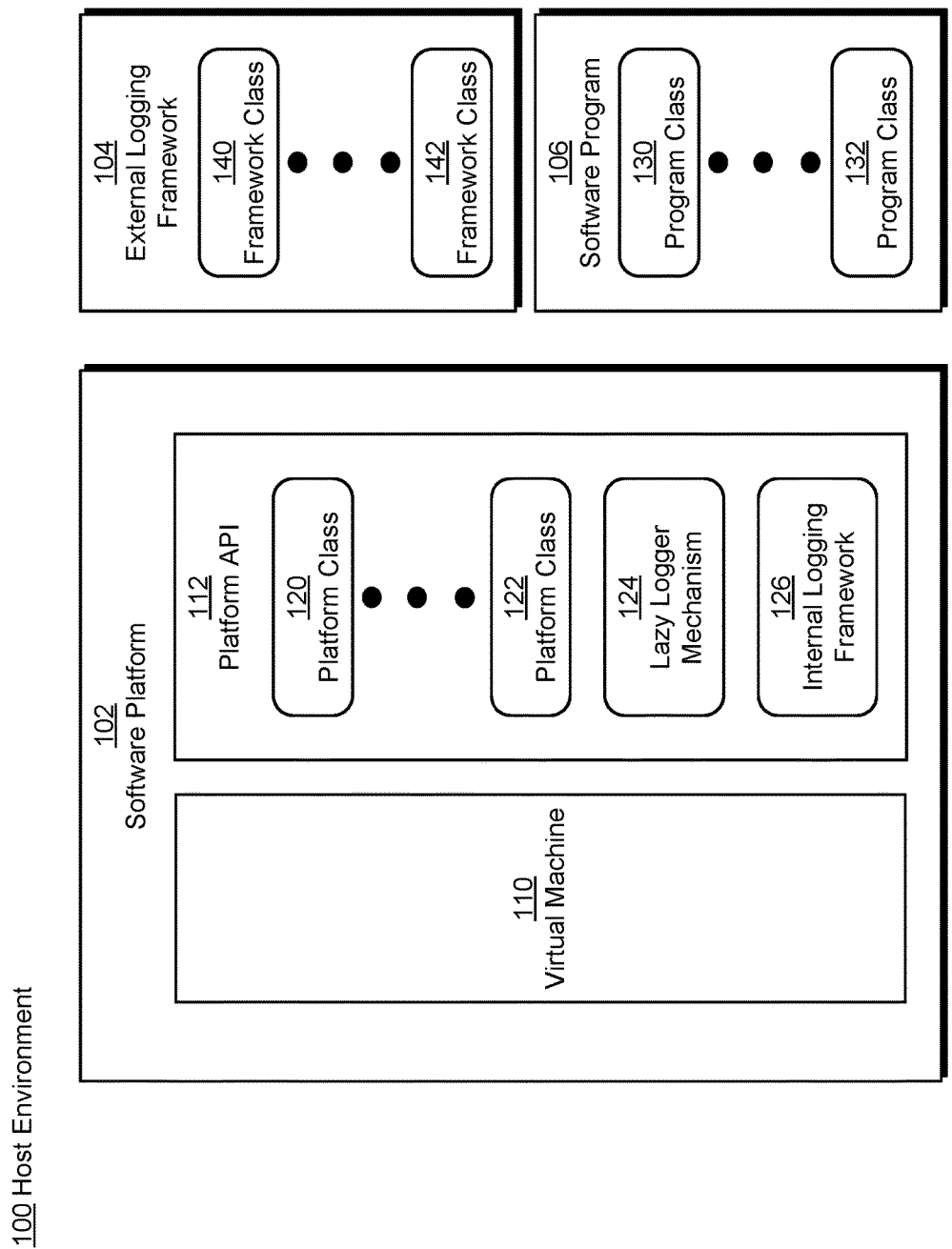
FIG. 1 shows a diagram of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for lazily logging events of the software program at various points during the software program's execution. During a startup of the software program, a software component that is associated with the software program may attempt to log an event. To ensure that the event is correctly logged, the logging of the event may be delayed until the software program's logging framework is initialized.

More specifically, the disclosed embodiments provide a method and system that enables (1) software components of the software program (e.g., program classes, which are classes that are part of the software program) and (2) software components of the software platform on which the software program depends (e.g., platform classes, which are classes that are part of the software platform) to log events through a single logging framework. However, certain logging frameworks (e.g., logging frameworks that are external to the software platform) cannot be initialized before the software platform's virtual machine has completed its bootstrap sequence. If a platform class attempts to log an event before the logging framework can be initialized, the logging attempt may fail. Thus, some embodiments may provide a lazy logger mechanism that (1) enables platform classes to log events using an external logging framework, and (2) gracefully handles instances where a platform class attempts to log an event before the external logging framework can be initialized.

During the initialization of a platform class, the platform class may request a real logger (i.e., a logger object provided by a logging framework that may be used to log events to an actual log) for logging events originating from the platform class using an external logging framework. However, if the virtual machine of the software platform, of which the platform class is a part, has not completed its bootstrap sequence, the platform class may instead receive a logger wrapper that is configured to lazily log events. When the platform class attempts to log an event with the logger wrapper, the logger wrapper may determine whether the virtual machine has booted. If the virtual machine is still booting, the logger wrapper may instantiate a bootstrap logger and pass the event to the bootstrap logger. In turn, the bootstrap logger may determine whether the virtual machine has booted. If the virtual machine is still booting, the bootstrap logger may queue the event within a temporary data structure, such as a queue that is created in memory. While the virtual machine continues its bootstrap sequence, the bootstrap logger may queue up one or more additional events originating from the platform class.

After the virtual machine completes its bootstrap sequence, the bootstrap logger may receive another event for logging from the logger wrapper. In response to determining that the virtual machine has booted, the bootstrap logger may initiate (1) the creation of a real logger, (2) the flushing of all queued events in the bootstrap logger to the real logger, which enables the real logger to log each of the queued events, (3) the replacement of the bootstrap logger with the real logger within the logger wrapper, and (4) the logging of the latest event using the real logger. Afterwards, all subsequent events originating from the platform class may be handled by the real logger, which may log each of the events without checking whether the virtual machine has completed its bootstrap sequence.

By enabling events originating from (1) the software program, and (2) the software platform to be logged by a single logging framework, some embodiments may provide a unified view of events occurring within the software program. This approach may be advantageous over approaches that require events originating from the software platform to be logged using a logging framework that is internal to the software platform. In cases where a user of the software program configures the software program to log with an external logging framework, the software program may be compelled to log platform-specific events with an internal logging framework and other events with the external logging framework. This may fragment various perspectives of the software program's state provided by logging, thereby making it harder to debug and/or monitor the software program. For example, users of the software program would need to (1) keep track of at least two separate sets of logs, and (2) maintain at least a first configuration for the internal logging framework and a second configuration for the external logging framework. In contrast, some embodiments may allow users to effectively monitor the software program by (1) keeping track of a single set of logs, and (2) maintaining a single configuration for an external logging framework.

In doing so, some embodiments may additionally encourage users of the software program to configure the software program to use an external logging framework. In general, an internal logging framework corresponds to an internal component of the software platform on which the software program depends. For example, if the software program corresponds to a Java (Java™ is a registered trademark of Oracle America, Inc.) application that depends on the Java Runtime Environment (JRE) and/or the Java Development Kit (JDK) software platforms, the internal logging framework provided by the JRE and/or the JDK may be the java.util.logging package (JUL, which is available in JDK 1.4 and later). Selecting an external logging framework to handle logging for a software program may provide advantages over defaulting to the internal logging framework provided by the software platform on which the software program runs. For instance, a user of the software program may choose from multiple external logging frameworks that have been created by the greater software community associated with the software platform. Because each external logging framework may provide different features and/or advantages, the user may choose the external logging framework that best suits the software program's needs. Additionally, advantages provided by an external logging framework over the internal logging framework may include: improved performance, more configuration options, more output handlers (e.g., console output handlers, file stream output handlers, and/or socket output handlers), compatibility with more design patterns, and/or more comprehensive documentation. By allowing platform classes of the software platform to log events using an external logging framework, some embodiments may further incentivize the user to select the external logging framework over the internal logging framework because the software program can now dispense with the internal logging framework entirely.

FIG. 1 shows a diagram of a system in accordance with the disclosed embodiments. As shown in FIG. 1, software program 106, which may depend on software platform 102, may execute on virtual machine 110, all of which may be contained within host environment 100. More specifically, prior to virtual machine 110 completing its bootstrap sequence, one of platform classes 120-122 may attempt to log an event with external logging framework 104 through lazy logger mechanism 124.

Host environment 100 may correspond to a stack of one or more software components that run on computing hardware, which may correspond to a smartphone, a cell phone, a personal digital assistant (PDA), a laptop computer, a desktop computer, a tablet computer, a server, a cluster of servers, a hypervisor, a container, or an embedded system.

Software program 106 may be an application that executes on an operating system, an embedded application that executes on firmware, an enterprise application, a database, a shared library, a device driver, and/or any other type of software program. Software program 106 may be written in a high-level programming language that can be compiled into an intermediate code via a compiler. Additionally, software program 106, in its intermediate code form, may be configured to execute on virtual machine 110. For example, software program 106 may be written in the Java programming language; virtual machine 110 may be a Java Virtual Machine (JVM); and software program 106 may be compiled into Java byte code, which may be executed on any software environment that includes a JVM. In addition to the virtual machine 110, software program 106 may depend on one or more software classes, packages, and/or modules provided by platform API 112. For example, during the startup of software program 106, at least one of platform classes 120-122 may be loaded and initialized. Additionally, software program 106 may be composed of one or more classes that specifically implement functionality of the software program, which are represented by program classes 130-132. For example, program classes 130-132 may each correspond to a class written in a high-level programming language (e.g., Java). These classes may be organized into one or more modules (e.g., a Java module). A module may be a deployable, manageable, natively reusable, composable, stateless unit of software that may provide a concise interface to consumers and define its own dependencies on one or more other modules. Thus, software program 106 may be composed of one or more modules, which each contain one or more of program classes 130-132. Moreover, software program 106 may be configured to log events using external logging framework 104. In other words, events originating from platform classes 120-122 and/or program classes 130-132 may be logged by one or more real loggers provided by external logging framework 104.

Software platform 102 may correspond to a computing platform on which software program 106 and other software programs are designed to execute while obeying constraints imposed by software platform 102 and using software facilities provided by software platform 102. Examples of a software platform include the JRE and the JDK. Facilities provided to software programs by software platform 102 may include virtual machine 110 and/or platform application programming interface (API) 112.

Platform API 112 may correspond to a set of platform classes that are included with a software platform, wherein the developers may use the platform classes to build software programs that execute on the software platform. The platform classes, which may include platform classes 120-122, may provide commonly used algorithms, data structures, mechanisms for input and output, and/or other code-based constructs that are commonly used in software programs. Platform API 112 may expose platform classes 120-122 in one or more base modules (e.g., the java.base Java module) that may be available prior to the completion of virtual machine 110's bootstrap sequence. Here, one or more classes (e.g., program classes 130-132) and/or modules of software program 106 may depend on one or more platform classes (e.g., platform classes 120-122) and/or modules of platform API 112. Platform API 112 may also provide lazy logger mechanism 124 and internal logging framework 126. It should be noted that because (1) program classes contained within software program 106 may depend on and/or inherit from platform classes provided by platform API 112, and (2) software program 106 executes on virtual machine 110, platform classes 120-122 may be referred to as software components that execute on virtual machine 110.

Lazy logger mechanism 124 may correspond to a set of classes and/or modules that encapsulate functionality used for allowing platform classes 120-122 and program classes 130-132 to log events using a logging framework. In particular, lazy logger mechanism 124 may provide software components that encapsulate real loggers provided by internal logging framework 126 and/or external logging framework 104 to provide additional functionality. These software components may include one or more logger factories, logger wrappers, and/or bootstrap loggers. Additionally, platform API 112 may expose lazy logger mechanism 124 in one or more base modules that may be available prior to the completion of virtual machine 110's bootstrap sequence. Lazy logger mechanism 124 will be discussed in further detail below with respect to FIGS. 2-6.

Internal logging mechanism 126 may correspond to a set of classes provided by platform API 112, which may be used by software program 106 to log events originating from program classes 130-132. In particular, internal logging mechanism 126 may expose, via an API, one or more methods that may be invoked by program classes 130-132 and platform classes 120-122 to log events. Once internal logging framework 126 receives an event for logging, the internal logging framework may record the event directly to a log, such as a plain text log file, a binary log file, and/or a database. In some embodiments, the event may be forwarded to a remote log server. Additionally, platform API 112 may expose internal logging mechanism 126 in one or more base modules that may be available prior to the completion of virtual machine 110's bootstrap sequence.

Virtual machine 110 may correspond to any virtual machine that provides an interpreter and/or a just-in-time (JIT) compiler for executing software program 106 in its intermediate code form. When software program 106 is first started, virtual machine 110 may enter a bootstrap sequence. In general, classes and/or modules contained within software program 106 and external logging framework 104 may not be loaded until after virtual machine 110 has finished booting. However, one or more classes and/or base modules provided by platform API 112 may be loaded before virtual machine 110 completes its bootstrap sequence. In other words, commonly used algorithms, data structures, mechanisms for input and output, and/or other code-based constructs that are provided by platform API 112 may be available early in software program 106's execution.

External logging framework 104 may correspond to a software library, component, package, framework, plugin and/or extension that may be used by software program 106 to handle the logging of events that originate from program classes 130-132. In particular, external logging framework 104 may expose, via an API, one or more methods that may be invoked by program classes 130-132 and platform classes 120-122 to log events. Once external logging framework 104 receives an event for logging, external logging framework 104 may record the event directly to a log, such as a plain text log file, a binary log file, and/or a database. In some embodiments, the event may be forwarded to a remote log server. Examples of an external logging framework may include Log4j, Apache Commons Logging, and/or a combination of Simple Logging Facade for Java (SLF4J) and Logback. External logging framework 104 may be composed of one or more classes that specifically implement functionality of the external logging framework, which are represented by framework classes 140-142. For example, framework classes 140-142 may each correspond to a class which may be organized into one or more modules. Additionally, it should be noted that external logging framework 104 is not provided by software platform 102 to software program 106. This separation between software platform 102 and external logging framework 104 may give rise to issues that are discussed in detail below.

As can be seen in FIG. 1, because program classes 130-132 and framework classes 140-142 are not part of software platform 102, these classes and/or their associated modules may not be loaded until after virtual machine 110 has completed its bootstrap sequence. In contrast, one or more classes and/or base modules found in platform API 112 may be loaded before virtual machine 110 finishes booting. Additionally, program classes 130-132 may adopt internal logging framework 126 and/or external logging framework 104 for logging their events. Because program classes 130-132 are generally not loaded before virtual machine 110 finishes booting, program classes 130-132 can initiate the loading of one or more of framework classes 140-142 without causing any circular dependency issues.

Platform classes 120-122 and internal logging framework 126, being part of software platform 102, may be loaded before virtual machine 110 finishes booting. Thus, platform classes 120-122 may adopt internal logging framework 126 for logging their events without introducing any circular dependency issues. However, allowing platform classes 120-122 to adopt external logging framework 104 may lead to circular dependency issues that are hard to diagnose, debug, and solve because a platform class may attempt to log an event prior to the completion of virtual machine 110's bootstrap sequence. If a platform class attempts to log an event before virtual machine 110 finishes booting, the platform class may cause one or more of framework classes 140-142 to load. However, because virtual machine 110 is still booting, the framework classes cannot be loaded without unexpected side effects, which may include causing one or more exceptions and/or causing software program 106 to crash. Thus, some embodiments may provide lazy logger mechanism 124, which may be used by platform classes 120-122 to log events using external logging framework 104 in a robust, reliable manner, as discussed in further detail below with respect to FIGS. 2-6.

Figure 2:
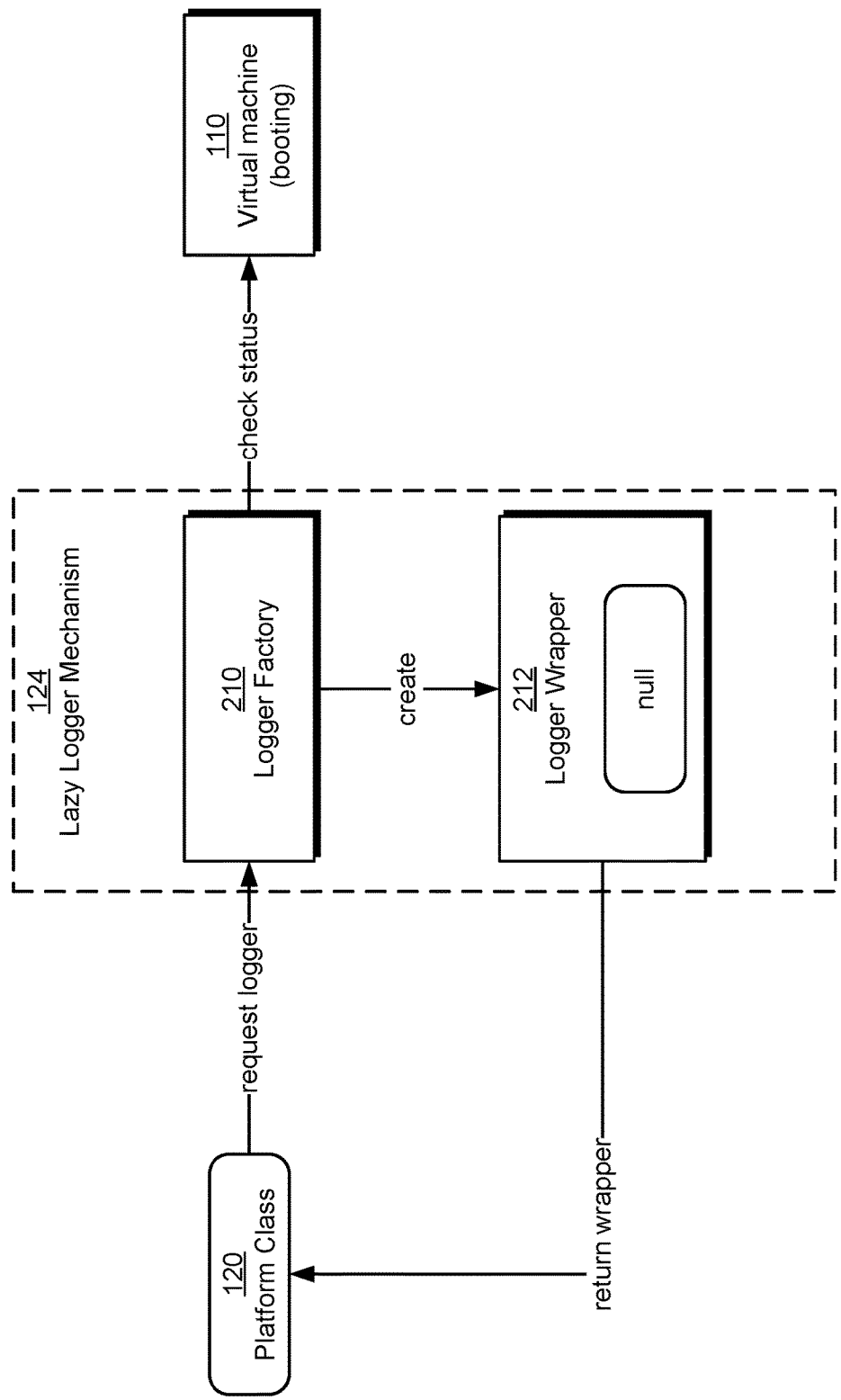
FIG. 2 shows a creation of a logger wrapper in accordance with the disclosed embodiments.

FIG. 2 shows a creation of a logger wrapper in accordance with the disclosed embodiments. More specifically, FIG. 2 discloses how platform class 120 obtains logger wrapper 212 from logger factory 210 during platform class 120's initialization. Logger factory 210, in response to determining that it may not yet be safe to return a real logger to platform class 120, may return logger wrapper 212 instead.

Platform class 120, being part of software platform 102, may begin initialization prior to the completion of virtual machine 110's bootstrap sequence. Because lazy logger mechanism 124 is also part of software platform 102, components of lazy logger mechanism 124, which may include logger factory 210, may be available to platform class 120 during its initialization. In some embodiments, logger factory 210's design may follow the factory method pattern, wherein logger factory 210 exists as a singleton that exposes one or more globally accessible methods. Meanwhile, platform class 120's definition may include a static member field that expects an instance of a class that implements a logger interface, wherein the platform class later uses the instance to log events. Classes that implement the logger interface may include the logger wrapper class (of which logger wrapper 212 is an instance) and/or one or more classes provided by internal logging framework 126 and/or external logging framework 104.

Instances of the logger wrapper class may be referred to as logger wrappers while instances of the one or more classes provided by internal logging framework 126 and/or external logging framework 104 may be referred to as real loggers. A logger wrapper is designed to wrap a real logger or a bootstrap logger. Because logger wrappers and real loggers both implement the logger interface, either may be assigned to the static member field of platform class 120. When an event is received, a real logger may be configured to store the event directly to a log via the logging framework that created and/or provided the real logger. A logger wrapper, on the other hand, may perform additional actions with the event depending on what the logger wrapper contains. For example, if the logger wrapper contains a bootstrap logger, the logger wrapper may have the bootstrap logger queue the event temporarily. If the logger wrapper contains a real logger, the logger wrapper may forward the event to the real logger, thereby allowing the real logger to store the event directly to a log.

As shown in FIG. 2, platform class 120, while initializing one or more static member fields, may request, from logger factory 210, an instance of a class that implements the logger interface. In response to platform class 120's request, logger factory 210 may check the status of virtual machine 110 to determine whether it has completed its bootstrap sequence. In some embodiments, platform API 112 may provide a method that can be invoked to determine virtual machine 110's status. In response to determining that virtual machine 110 is still booting, logger factory 210 may create logger wrapper 212 and return it to platform class 120. Platform class 120 may then assign logger wrapper 212 to the relevant static member field. As shown by the null element inside logger wrapper 212, the logger wrapper may not yet be initialized as it does not contain a real logger or a bootstrap logger.

Figure 3:
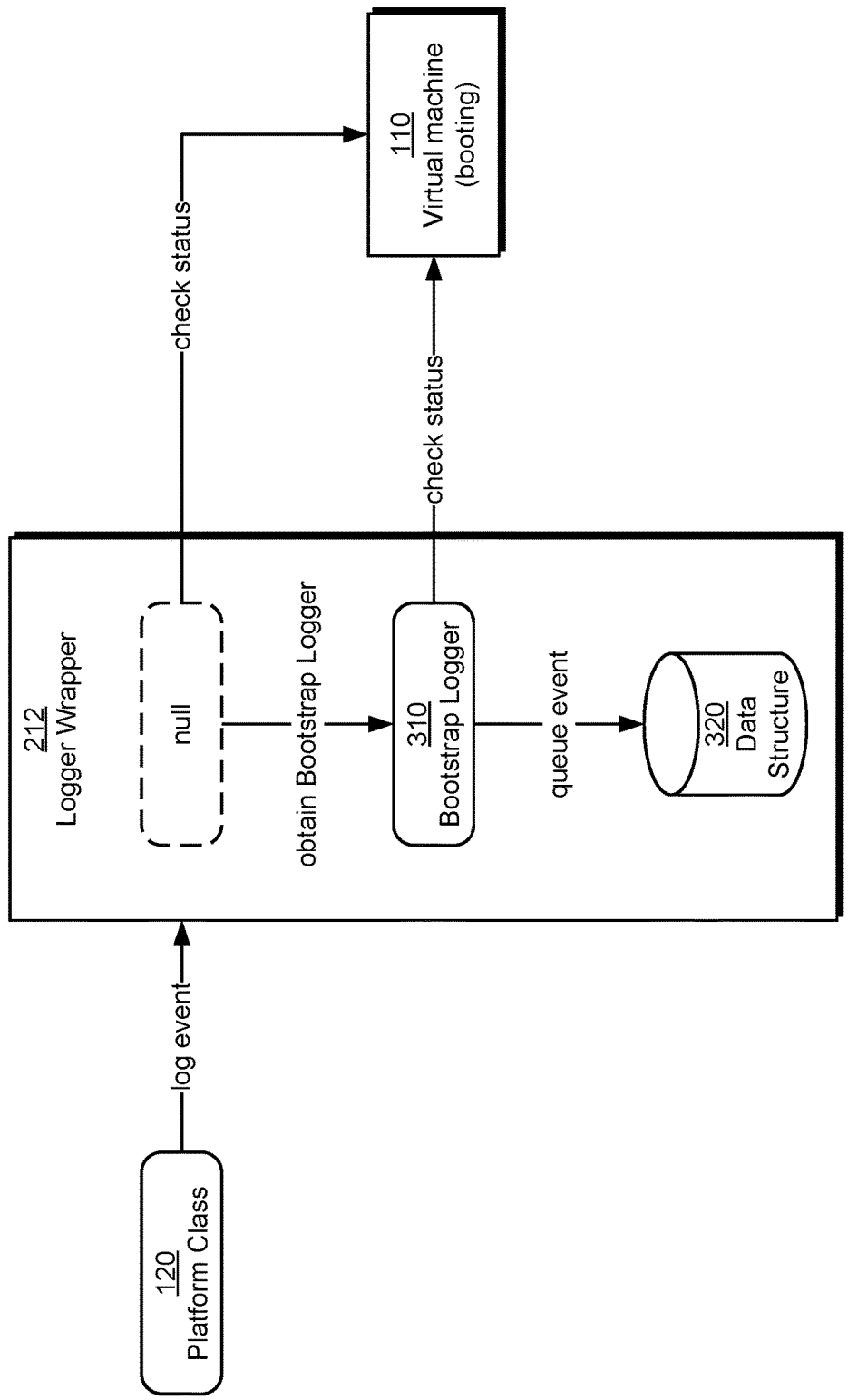
FIG. 3 shows an initialization of a logger wrapper in accordance with the disclosed embodiments.

FIG. 3 shows an initialization of a logger wrapper in accordance with the disclosed embodiments. More specifically, FIG. 3 discloses how logger wrapper 212 obtains bootstrap logger 310 in response to platform class 120 attempting to log an event with logger wrapper 212.

After platform class 120 has initialized but before virtual machine 110 has completed its bootstrap sequence, platform class 120 may attempt to log an event with logger wrapper 212 by invoking a logging method provided by the logger interface. Logger wrapper 212 may then check the status of virtual machine 110 to determine that it is still booting. Bootstrap logger 310 may then be activated. More specifically, in response to determining that virtual machine 110 is still booting, logger wrapper 212 may next obtain bootstrap logger 310 and assign it to one of logger wrapper 212's member fields, which is represented by the replacement of the null element with bootstrap logger 310. Next, logger wrapper 212 may forward the event to bootstrap logger 310. In turn, bootstrap logger 310 checks the status of virtual machine 110 to determine that it is still booting. In response to determining that virtual machine 110 is still booting, bootstrap logger 310 may queue the event in a particular storage location, which may be a data structure that is stored in memory (e.g., data structure 320) and can be created prior to the completion of virtual machine 110's bootstrap sequence, such as an array, a queue, a list, and/or a tree. In some embodiments, the temporary data structure may be first in, first out (FIFO) (e.g., a FIFO queue). At this point, logger wrapper 212 can be said to be initialized.

Figure 4:
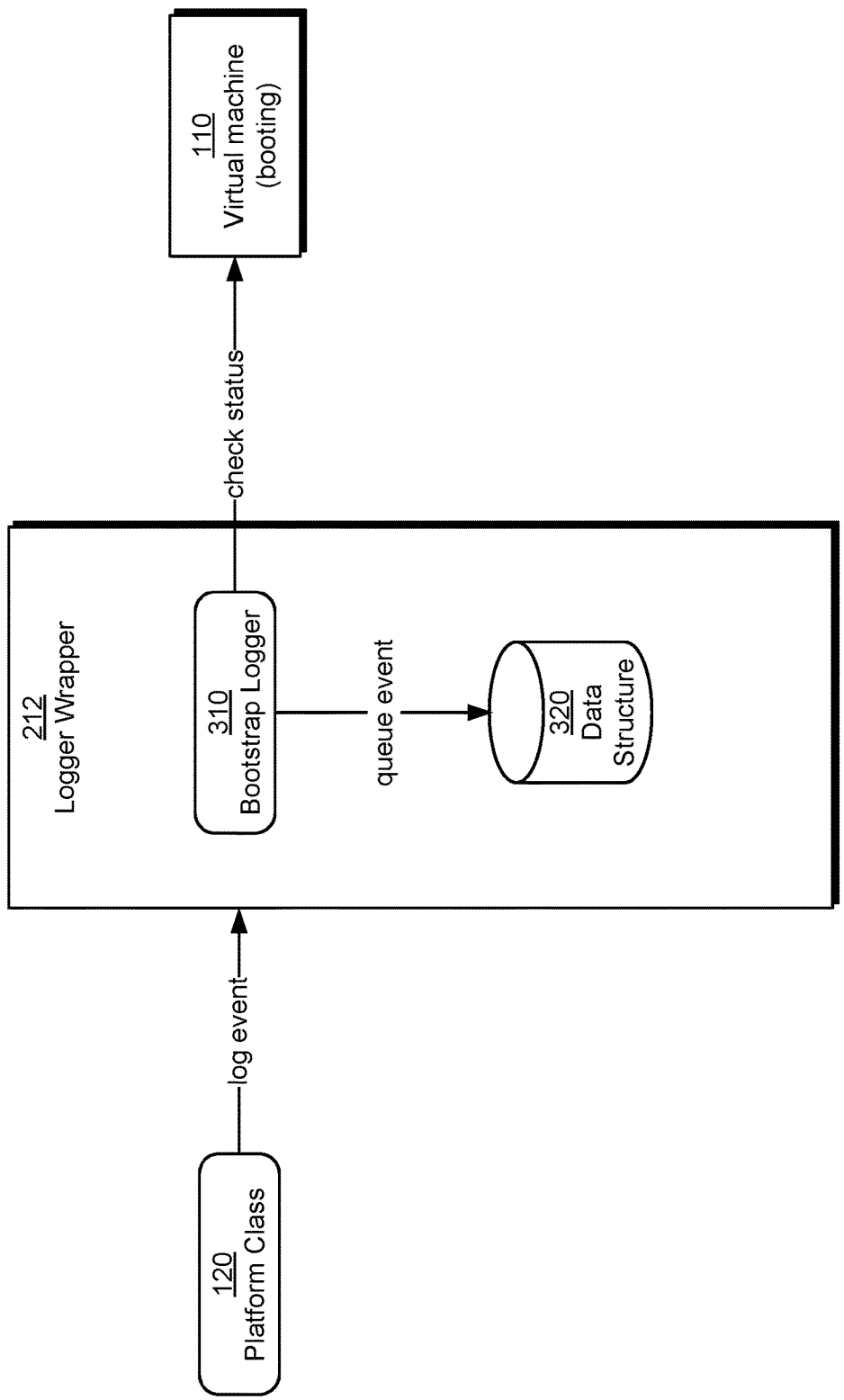
FIG. 4 shows a queuing of an event in accordance with the disclosed embodiments.

FIG. 4 shows a queuing of an event before the virtual machine has finished booting in accordance with the disclosed embodiments. After both platform class 120 and logger wrapper 212 have initialized but before virtual machine 110 has finished its bootstrap sequence, platform class 120 may attempt to log another event with logger wrapper 212. Logger wrapper 212 may forward the event to bootstrap logger 310. In turn, bootstrap logger 310 checks the status of virtual machine 110 to determine that it is still booting. In response to determining that virtual machine 110 is still booting, bootstrap logger 310 may queue the event within data structure 320. Afterwards, before virtual machine 110 finishes booting, platform class 120 may attempt to log one or more additional events, causing the one or more events to be queued within data structure 320. In some embodiments, although the maximum number of queued events may vary depending on the amount of memory that is available to software program 106, the average number of queued events may not be very high because the majority of events may be logged after virtual machine 110 finishes its bootstrap sequence.

Figure 5:
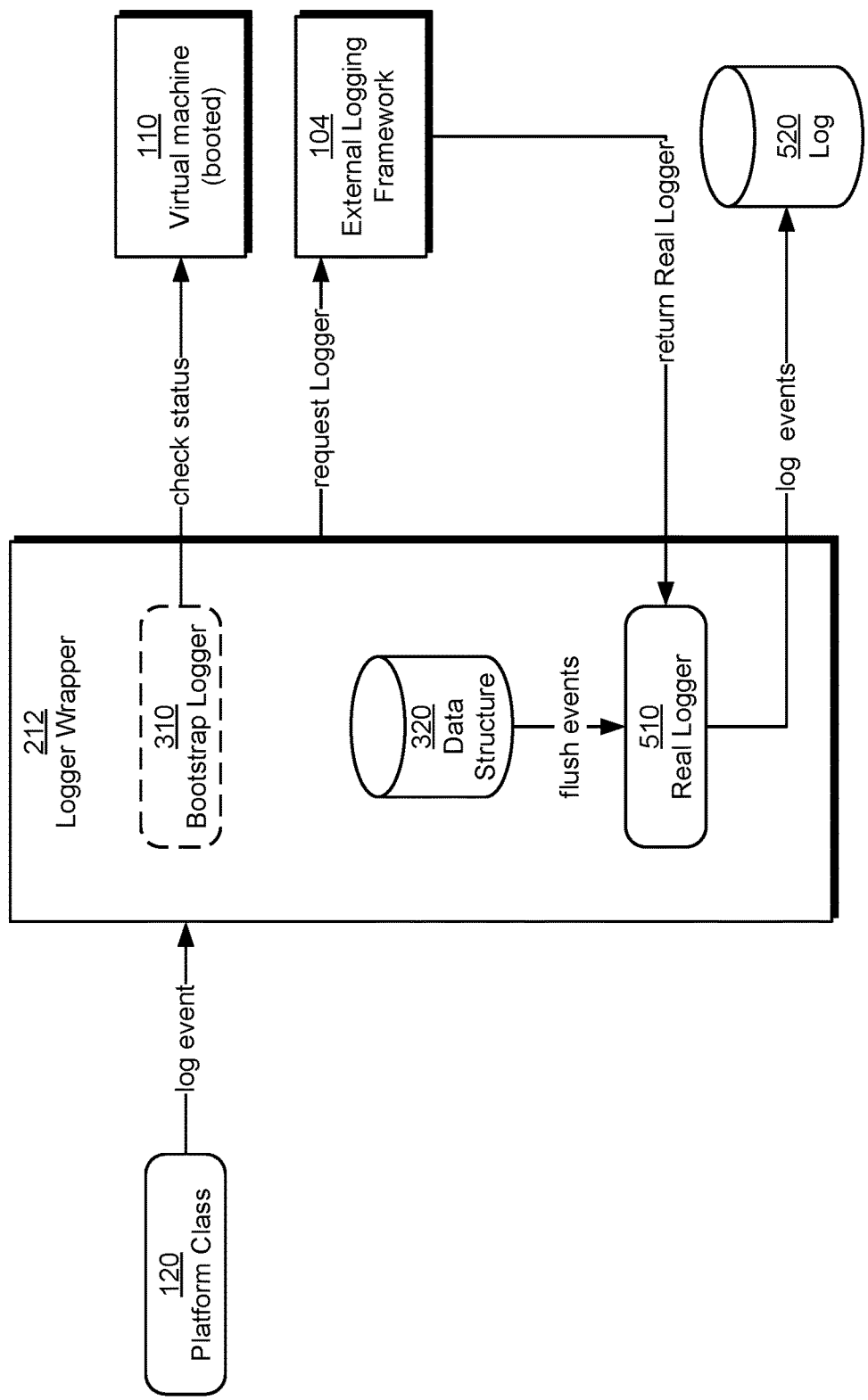
FIG. 5 shows a replacement of a bootstrap logger in accordance with the disclosed embodiments.

FIG. 5 shows a replacement of a bootstrap logger in accordance with the disclosed embodiments. More specifically, FIG. 5 discloses how bootstrap logger 310 is replaced with real logger 510 in response to determining that virtual machine 110 has finished booting.

After virtual machine 110 has completed its bootstrap sequence, platform class 120 may attempt to log its first event after the completion with logger wrapper 212. Logger wrapper 212 may then forward the event to bootstrap logger 310. In turn, bootstrap logger 310 may check the status of virtual machine 110 to determine that it has booted. In response to determining that virtual machine has booted, bootstrap logger 310 may directly or indirectly initiate the activation of real logger 510 by making a request to external logging framework 104 for a real logger. External logging framework 104 may create real logger 510 using a class that implements the logger interface and return the real logger to logger wrapper 212. Bootstrap logger 310 may also directly or indirectly initiate the flushing of all events queued in data structure 320 to real logger 510, which enables real logger 510 to log the queued events. To log an event, real logger 510 may forward the event to a remote log server and/or directly store the event to a subsequent storage location, such as log 520, which may be a plain text log file, a binary log file, and/or a database. Next, bootstrap logger 310 may directly or indirectly cause the replacement of bootstrap logger 310 with real logger 510 in logger wrapper 212. In some embodiments, logger wrapper 212 may assign real logger 510 to the member field that previously referenced bootstrap logger 310, thereby freeing bootstrap logger 310 to be garbage-collected. After the replacement, real logger 510 may log the event that was received from platform class 120 after virtual machine 110 booted. As shown in FIGS. 2-5, prior to its replacement, bootstrap logger 310 may have invariably checked the status of virtual machine 110 whenever logger wrapper 212 received an event for logging. As shown in FIG. 5, real logger 510 may log an event without checking the status of virtual machine 110. Thus, one of the advantages of replacing bootstrap logger 310 with real logger 510 within logger wrapper 212 is that the check is no longer performed, thereby making the logging process more efficient.

Figure 6:
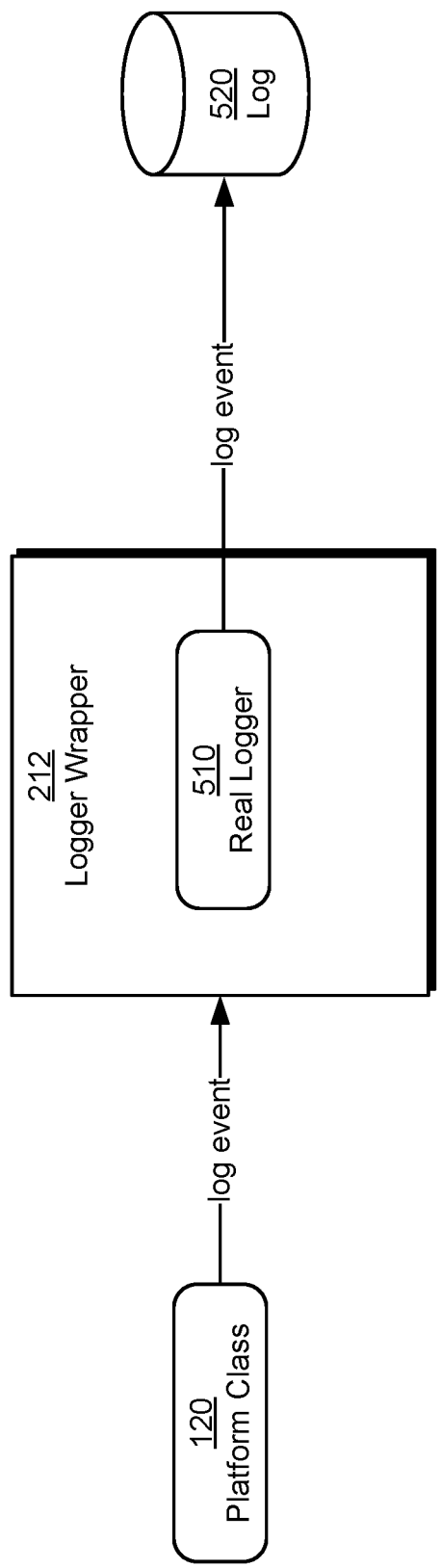
FIG. 6 shows a logging of an event in accordance with the disclosed embodiments.

FIG. 6 shows a logging of an event after the virtual machine has finished booting in accordance with the disclosed embodiments. After virtual machine 110 has booted, platform class 120 may attempt to log another event with logger wrapper 212. Logger wrapper 212 may forward the event to real logger 510. In turn, real logger 510 may log the event without checking the status of virtual machine 110.

Figure 7:
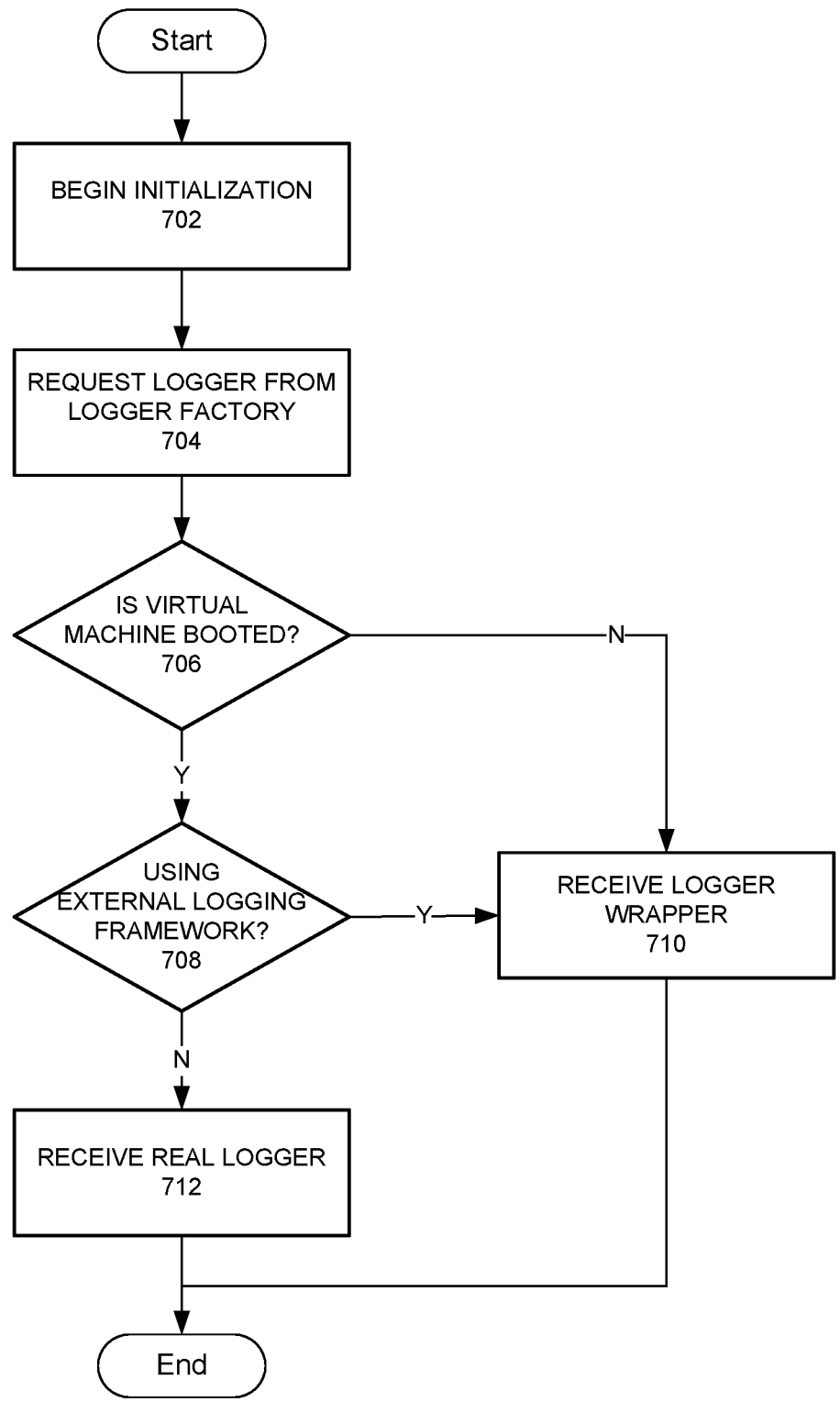
FIG. 7 shows a flowchart illustrating an exemplary process of initializing a platform class in accordance with the disclosed embodiments.

FIG. 7 shows a flowchart illustrating an exemplary process of initializing a platform class in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the embodiments.

During the startup of a software program, a platform class that is part of the software platform on which the software program depends begins initialization (operation 702). While initializing its static member fields, the platform class may request (operation 704) an instance of a class that implements the logger interface (i.e., a logger) from a logger factory (e.g., by invoking a method exposed by the logger factory). Next, the logger factory may determine whether the virtual machine of the software platform has finished its bootstrap sequence (decision 706). If the virtual machine is still booting, the logger factory may return an uninitialized logger wrapper to the platform class (operation 710). If the virtual machine has finished booting, the logger factory may determine whether the software program is configured to log using an external logging framework or an internal logging framework (decision 708). If the software program is configured to log using an external logging framework (e.g., external logging framework 104), the logger factory may return an uninitialized logger wrapper to the platform class (operation 710). If the software program is configured to log using the internal logging framework (e.g., internal logging framework 126), the logger factory may obtain a real logger from the internal logging framework and return the real logger to the platform class (operation 712). By returning a real logger to the platform class only when (1) the virtual machine is booted and (2) the software program is configured to log using the internal logging framework, some embodiments may minimize the risk of loading one or more classes and/or modules before they can be loaded. In some embodiments, even if (1) the virtual machine is booted and (2) the software program is configured to log using the internal logging framework, the logging factory may still return an uninitialized logger wrapper if the internal logging framework is using a custom configuration instead of the default configuration. It should be noted that in some embodiments, program classes (e.g., program classes 130-132) may invariably receive real loggers from the logger factory regardless of whether the software program is configured to log using the internal logging framework or an external logging framework because program classes, in general, do not initialize until after the virtual machine has booted.

Figure 8:
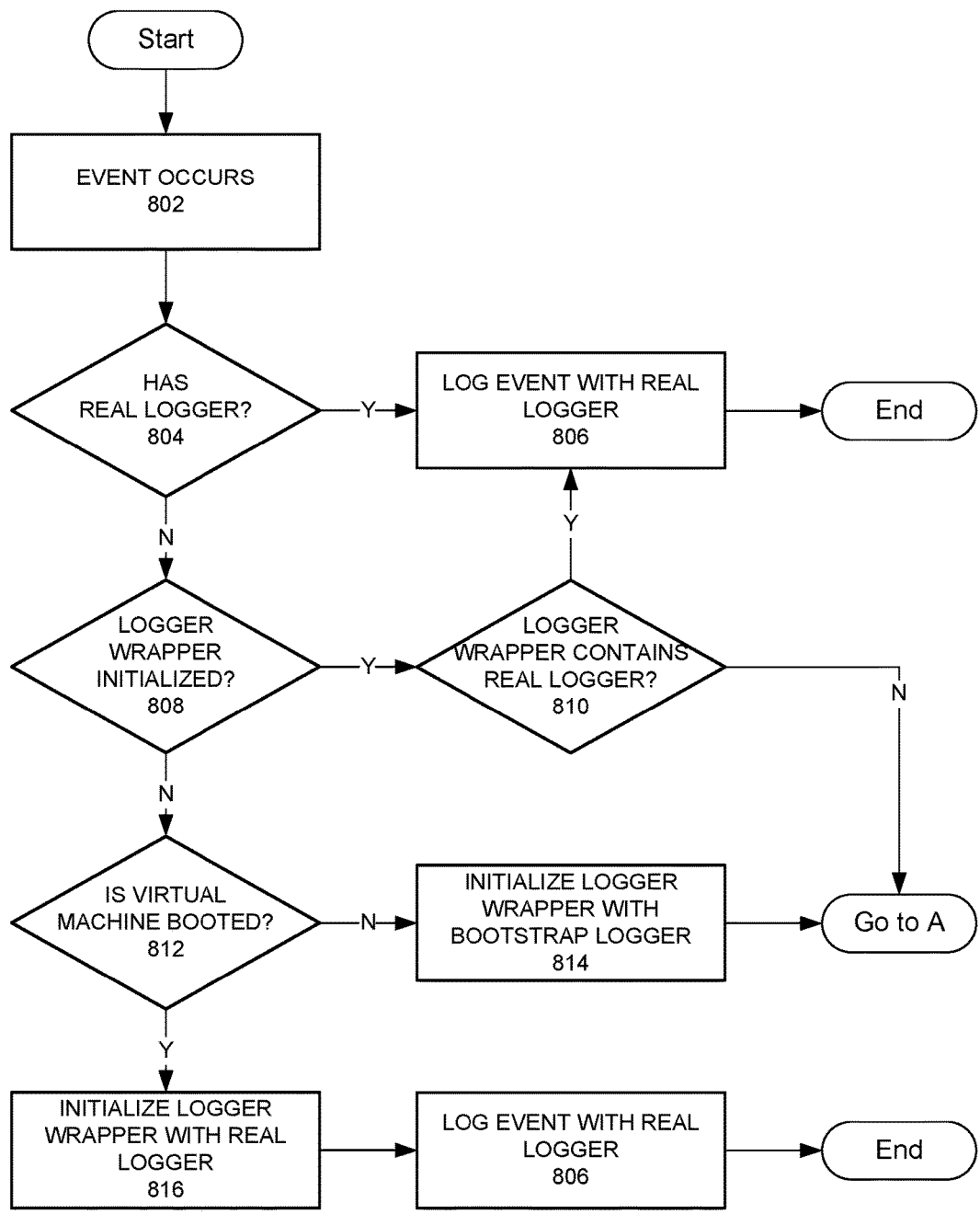
FIG. 8 shows a flowchart illustrating an exemplary process of logging an event in accordance with the disclosed embodiments.

FIG. 8 shows a flowchart illustrating an exemplary process of logging an event in accordance with the disclosed embodiments. In one or more embodiments, one or more of the steps may be omitted, repeated, and/or performed in a different order. Accordingly, the specific arrangement of steps shown in FIG. 8 should not be construed as limiting the scope of the embodiments.

During the startup and/or execution of a software program, an event occurs in a platform class that is part of the software platform on which the software program depends (operation 802). For example, the event may contain recordable information (e.g., timestamp, thread identifier, etc.) pertaining to an exception thrown within the software program, an interaction by the user of the software program, and/or a statistic of the software program that is scheduled to be recorded from time to time. In some embodiments, the event may correspond to an object. If the platform class previously obtained a real logger from the logger factory (decision 804), the platform class passes the event to the real logger (e.g., by invoking a logging method exposed by the logger interface that the real logger implements) to have the real logger log the event (operation 806). If the platform class previously obtained a logger wrapper from the logger factory (decision 804), the platform class passes the event to the logger wrapper (e.g., by invoking a logging method exposed by the logger interface that the logger wrapper implements). If the logger wrapper is initialized (for example, from handling a previous event) (decision 808), and if the logger wrapper contains a real logger (decision 810), the logger wrapper passes the event to the real logger to have the real logger log the event (operation 806). If the logger wrapper contains a bootstrap logger (decision 810), the logger wrapper passes the event to the bootstrap logger (go to starting point A in FIG. 9). If the logger wrapper has not yet been initialized (decision 808), the logger wrapper determines whether the virtual machine provided by the software platform is booted (decision 812). If the virtual machine is booted, the logger wrapper may initialize itself by obtaining a real logger from a logging framework that is being used by the software program (e.g., internal logging framework 126 or external logging framework 104) (operation 816). The logger wrapper may then pass the event to the real logger to have the real logger log the event (operation 806). If the virtual machine has not finished booting (decision 812), the logger wrapper may initialize itself by obtaining a bootstrap logger (operation 814) and pass the event to the bootstrap logger (go to starting point A in FIG. 9).

Figure 9:
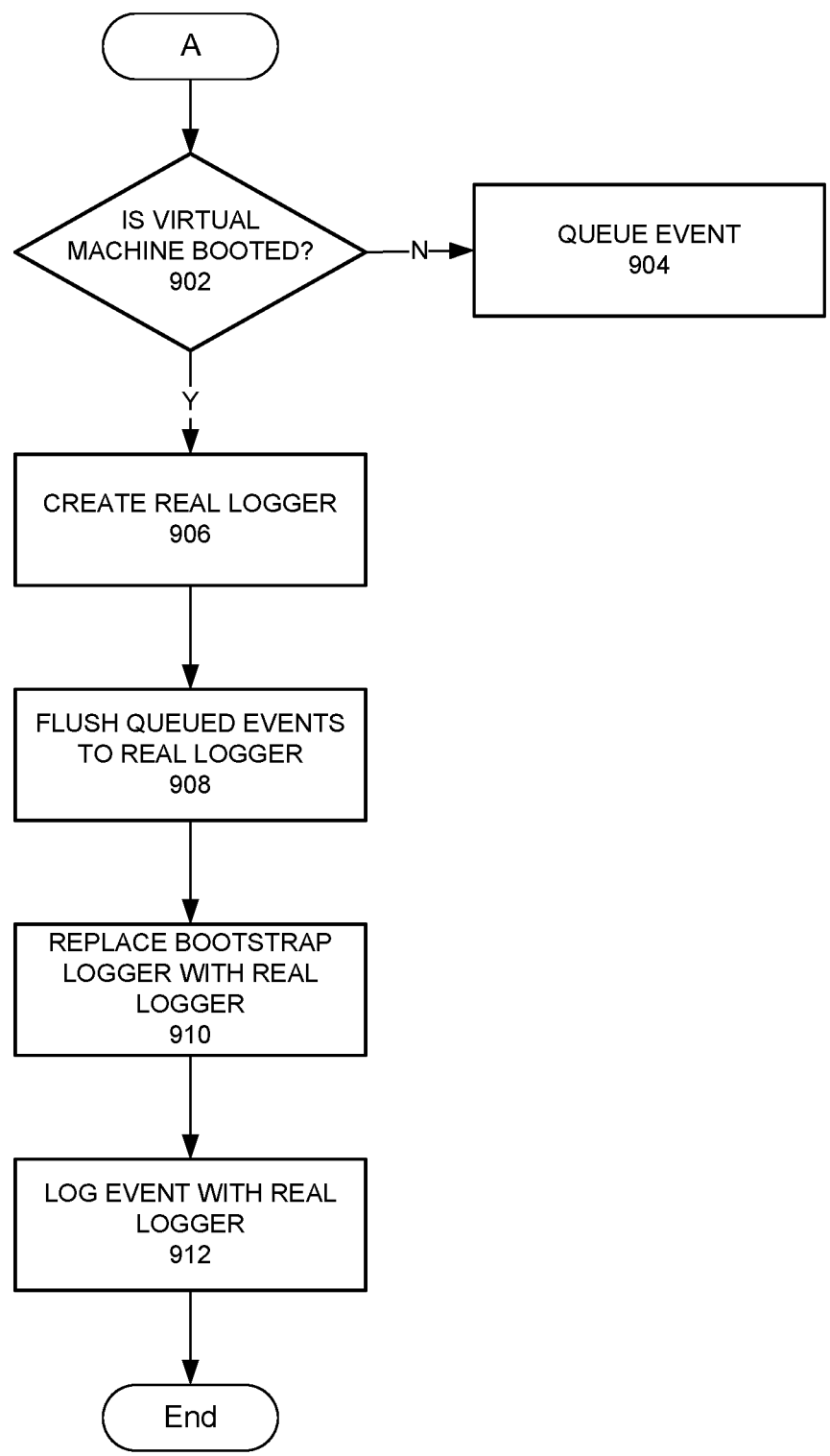
FIG. 9 shows a flowchart illustrating an exemplary process of logging an event in accordance with the disclosed embodiments.

FIG. 9 shows a flowchart illustrating an exemplary process of logging an event in accordance with the disclosed embodiments. In one or more embodiments, one or more of the steps may be omitted, repeated, and/or performed in a different order. Accordingly, the specific arrangement of steps shown in FIG. 9 should not be construed as limiting the scope of the embodiments.

Continuing from FIG. 8, after the bootstrap logger receives the event from the logger wrapper, the bootstrap logger may determine whether the virtual machine has finished booting (decision 902). If the virtual machine is still booting, the bootstrap logger may queue the event in a data structure stored in memory (operation 904). In some embodiments, a timestamp may be associated with the queue entry to preserve the time at which the event was queued. Later, when the queued entry is flushed to a real logger, the timestamp may be used to recreate an accurate timestamp (i.e., a timestamp of when the event was queued rather than when the event was flushed) for the corresponding log entry. If the virtual machine has finished booting (decision 902), the bootstrap logger may cause the logging framework to create a real logger (operation 906). Next, the bootstrap logger may flush previous events that are queued in the data structure to the real logger to have the real logger log each of the queued events (operation 908). The bootstrap logger may then cause the logger wrapper to replace the bootstrap logger with the real logger (operation 910). Next, the logger wrapper may pass the event to the real logger to have the real logger log the event (operation 912).

Figure 10:
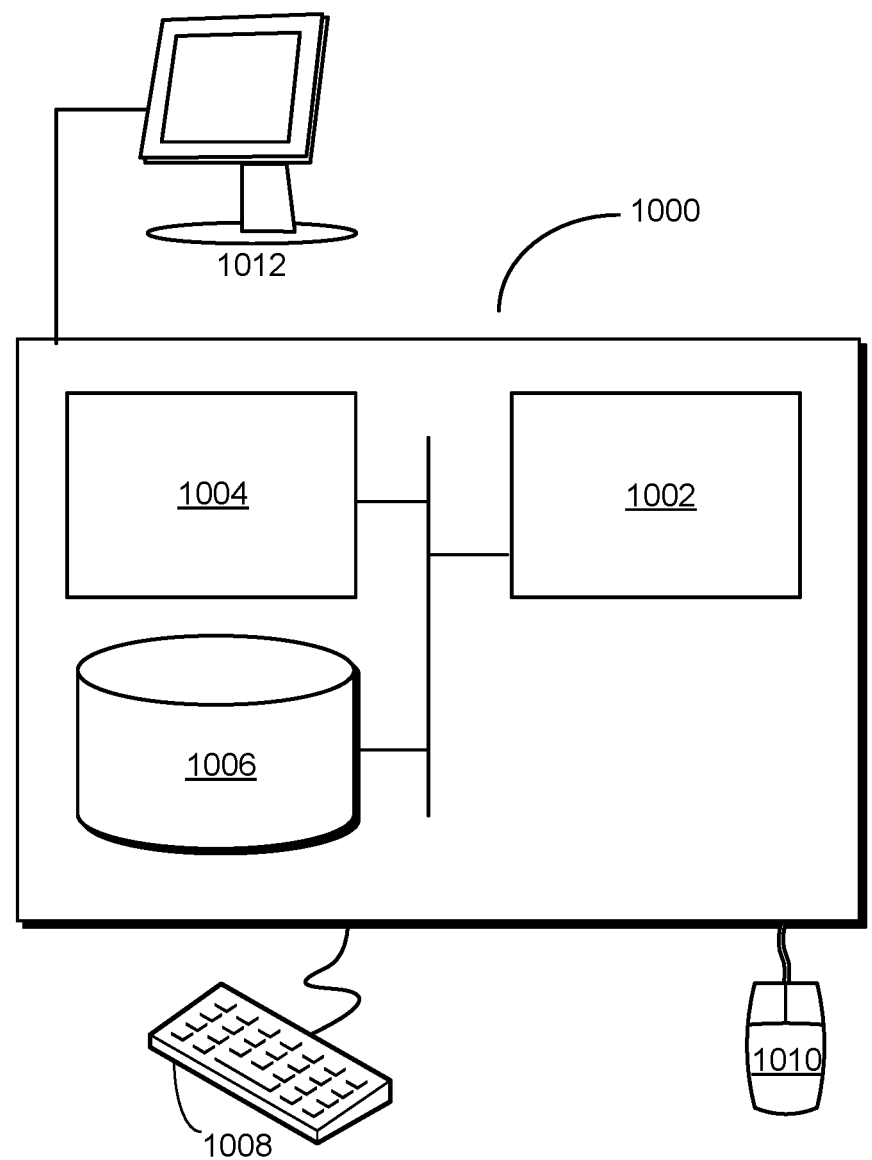
FIG. 10 shows a computer system in accordance with the disclosed embodiments.

FIG. 10 shows a computer system 1000 in accordance with an embodiment. Computer system 1000 may correspond to an apparatus that includes a processor 1002, memory 1004, storage 1006, and/or other components found in electronic computing devices such as personal computers, laptop computers, workstations, servers, mobile phones, tablet computers, and/or portable media players. Processor 1002 may support parallel processing and/or multi-threaded operation with other processors in computer system 1000. Computer system 1000 may also include input/output (I/O) devices such as a keyboard 1008, a mouse 1010, and a display 1012.

Computer system 1000 may include functionality to execute various components of the present embodiments. In particular, computer system 1000 may include an operating system (not shown) that coordinates the use of hardware and software resources on computer system 1000, as well as one or more applications that perform specialized tasks for the user. To perform tasks for the user, applications may obtain the use of hardware resources on computer system 1000 from the operating system, as well as interact with the user through a hardware and/or software linker provided by the operating system.

In one or more embodiments, computer system 1000 provides a lazy logger mechanism that enables classes of a software platform to log events with an external logging framework without risk of introducing circular dependency issues. The system may include a lazy logger apparatus (i.e., a logger wrapper and/or a bootstrap logger) that receives an event for logging. If the virtual machine provided by the software platform has not finished its bootstrap sequence, the lazy logger apparatus may cause the event to be queued in a data structure stored in memory. Otherwise, if the virtual machine has finished booting, the lazy logger apparatus may cause the event to be logged by the external logging framework.

In addition, one or more components of computer system 1000 may be remotely located and connected to the other components over a network. Portions of the present embodiments (e.g., storage apparatus, extraction apparatus, etc.) may also be located on different nodes of a distributed system that implements the embodiments. For example, the present embodiments may be implemented using a cloud computing system that improves the knowledge and management of memory consumption in a set of remote software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method, comprising:
   responsive to receiving one or more events to be logged from a software component during a bootstrap sequence of a virtual machine that the software component executes on, queuing the one or more events in a particular storage location using a bootstrap logger, wherein the bootstrap logger is determined by the virtual machine;
   subsequent to a completion of the bootstrap sequence:
      activating a subsequent logger, wherein the activation of the subsequent logger is dependent on the completion of the bootstrap sequence, wherein the subsequent logger is determined by the software component;
      flushing events queued in the particular storage location to the subsequent logger, thereby enabling the subsequent logger to log each of the queued events to a subsequent storage location; and
      replacing the bootstrap logger with the subsequent logger; and
   responsive to receiving a subsequent event to be logged from the software component, logging the subsequent event to the subsequent storage location using the subsequent logger, wherein events originating from the virtual machine and events originating from the software component are logged by a single logging framework and presented in a unified view.

2. The computer-implemented method of claim 1:
   wherein the method is performed by a logger wrapper that encapsulates the bootstrap logger prior to the replacement of the bootstrap logger with the subsequent logger and encapsulates the subsequent logger after the replacement; and
   wherein the replacement of the bootstrap logger with the subsequent logger is initiated by the bootstrap logger.

3. The computer-implemented method of claim 1:
   wherein, prior to the replacement of the bootstrap logger with the subsequent logger, the bootstrap logger performs a check on whether the bootstrap sequence has been completed whenever an event is received from the software component; and
   wherein the replacement of the bootstrap logger with the subsequent logger removes the check.

4. The computer-implemented method of claim 1, wherein flushing the events queued in the particular storage location to the subsequent logger is performed in response to receiving a particular event to be logged from the software component, wherein no events are received from the software component between the completion of the bootstrap sequence and the reception of the particular event.

5. The computer-implemented method of claim 4, wherein after replacing the bootstrap logger with the subsequent logger, the method further comprises logging the particular event to the subsequent storage location using the subsequent logger.

6. The computer-implemented method of claim 1, wherein prior to receiving the one or more events to be logged from the software component, the method further comprises:
   receiving a first event from the software component, wherein no events are received from the software component prior to the reception of the first event;
   determining whether the bootstrap sequence has been completed; and
   responsive to determining that the bootstrap sequence has not been completed, activating the bootstrap logger.

7. The computer-implemented method of claim 1, wherein the particular storage location comprises a first in, first out (FIFO) queue.

8. The computer-implemented method of claim 1, wherein logging an event to the subsequent storage location using the subsequent logger comprises directly storing the event to at least one of the following:
   a plain text log file;
   a binary log file; and
   a database.

9. An apparatus, comprising:
   one or more processors; and
   memory storing instructions that, when executed by the one or more processors, cause the apparatus to:
      responsive to receiving one or more events to be logged from a software component during a bootstrap sequence of a virtual machine that the software component executes on, queue the one or more events in a particular storage location using a bootstrap logger, wherein the bootstrap logger is determined by the virtual machine;
      subsequent to a completion of the bootstrap sequence:
         activate the subsequent logger, wherein the activation of the subsequent logger is dependent on the completion of the bootstrap sequence, wherein the subsequent logger is determined by the software component;
         flush events queued in the particular storage location to the subsequent logger, thereby enabling the subsequent logger to log each of the queued events to a subsequent storage location; and
         replace the bootstrap logger with the subsequent logger; and
      responsive to receiving a subsequent event to be logged from the software component, log the subsequent event to the subsequent storage location using the subsequent logger, wherein events originating from the virtual machine and events originating from the software component are logged by a single logging framework and presented in a unified view.

10. The apparatus of claim 9:
wherein, prior to the replacement of the bootstrap logger with the subsequent logger, the bootstrap logger performs a check on whether the bootstrap sequence has been completed whenever an event is received from the software component; and
wherein the replacement of the bootstrap logger with the subsequent logger removes the check.

11. The apparatus of claim 9, wherein flushing the events queued in the particular storage location to the subsequent logger is performed in response to receiving a particular event to be logged from the software component, wherein no events are received from the software component between the completion of the bootstrap sequence and the reception of the particular event.

12. The apparatus of claim 11, wherein after replacing the bootstrap logger with the subsequent logger, the instructions further cause the apparatus to log the particular event to the subsequent storage location using the subsequent logger.

13. The apparatus of claim 9, wherein prior to receiving the one or more events to be logged from the software component, the instructions further cause the apparatus to:
receive a first event from the software component, wherein no events are received from the software component prior to the reception of the first event;
determine whether the bootstrap sequence has been completed; and
responsive to determining that the bootstrap sequence has not been completed, activate the bootstrap logger.

14. The apparatus of claim 9, wherein the particular storage location comprises a first in, first out (FIFO) queue.

15. The apparatus of claim 9, wherein logging an event to the subsequent storage location using the subsequent logger comprises directly storing the event to at least one of the following:
a plain text log file;
a binary log file; and
a database.

16. One or more non-transitory computer-readable storage media storing instructions that when executed by a computer cause the computer to perform a method, the method comprising:
responsive to receiving one or more events to be logged from a software component during a bootstrap sequence of a virtual machine that the software component executes on, queuing the one or more events in a particular storage location using a bootstrap logger, wherein the bootstrap logger is determined by the virtual machine;
subsequent to a completion of the bootstrap sequence:
activating the subsequent logger, wherein the activation of the subsequent logger is dependent on the completion of the bootstrap sequence, wherein the subsequent logger is determined by the software component;
flushing events queued in the particular storage location to the subsequent logger, thereby enabling the subsequent logger to log each of the queued events to a subsequent storage location; and
replacing the bootstrap logger with the subsequent logger; and
responsive to receiving a subsequent event to be logged from the software component, logging the subsequent event to the subsequent storage location using the subsequent logger, wherein events originating from the virtual machine and events originating from the software component are logged by a single logging framework and presented in a unified view.

17. The non-transitory computer-readable storage media of claim 16:
wherein, prior to the replacement of the bootstrap logger with the subsequent logger, the bootstrap logger performs a check on whether the bootstrap sequence has been completed whenever an event is received from the software component; and
wherein the replacement of the bootstrap logger with the subsequent logger removes the check.

18. The non-transitory computer-readable storage media of claim 16, wherein flushing the events queued in the particular storage location to the subsequent logger is performed in response to receiving a particular event to be logged from the software component, wherein no events are received from the software component between the completion of the bootstrap sequence and the reception of the particular event.

19. The non-transitory computer-readable storage media of claim 18, wherein after replacing the bootstrap logger with the subsequent logger, the method further comprises logging the particular event to the subsequent storage location using the subsequent logger.

20. The non-transitory computer-readable storage media of claim 16, wherein prior to receiving the one or more events to be logged from the software component, the method further comprises:
receiving a first event from the software component, wherein no events are received from the software component prior to the reception of the first event;
determining whether the bootstrap sequence has been completed; and responsive to determining that the bootstrap sequence has not been completed, activating the bootstrap logger.

* * * * *